Patented Aug. 29, 1939

2,171,494

UNITED STATES PATENT OFFICE

2,171,494

HYDROXY HALOGENATED BENZENE DERIVATIVES AND USES THEREFOR

Lucas P. Kyrides, Webster Groves, Mo., assignor, by mesne assignments, to Monsanto Chemical Company, a corporation of Delaware No Drawing. Application March 21, 1932, Serial No. 600,380

22 Claims. (Cl. 260—625)

This invention relates to a novel class of phenol compositions characterized in that they contain at least one halogen atom, at least one free hydroxyl group, and an aliphatic radical joined to the benzene nucleus.

The object of the invention is to provide a novel class of halogenated phenolic compositions which possess inordinate bactericidal, germicidal as well as general disinfecting properties.

Heretofore certain alkyl (acyl) and alkyl resorcinols have been proposed as general disinfecting agents. The present invention contemplates phenolic compositions represented by the following formula:

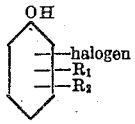

where in the case of alkyl and acyl derivatives $R_1$ is a hydroxy group and $R_2$ is an alkyl or acyl group having more than four and not more than twelve carbon atoms, or where in the case of the ether derivatives $R_1$ is a hydrogen atom and $R_2$ is an alkoxy (ether) group having more than four and not more than twelve carbon atoms.

The inordinate efficacy of this class of compounds is exemplified by the fact that whereas hexyl resorcinol possesses a phenol co-efficient as measured by the Reddish method of 125, chlorhexyl-resorcinol tested under the same conditions and on the same strain of bacteria possesses a phenol coefficient of 330.

In general, compositions contemplated by the present invention having a relatively large number of carbon atoms in the aliphatic chain are more effective against Staphylococcus aureus, whereas those having relatively fewer carbon atoms in the aliphatic chain are more effective against Bacillus-typhosus. Under the circumstances, it is advantageous to employ mixtures of the material where general disinfection is sought.

Alkyl resorcinols are made conveniently by reacting an aliphatic acid with resorcinol in the presence of zinc chloride whereby the corresponding alkylyl resorcinol is formed which may be reduced by the Clemmensen method (using hydrochloric acid and amalgamated zinc) to form the alkyl resorcinol. Hexyl resorcinol is derived in this manner from caproic acid through hexylyl resorcinol as the intermediate ketone.

Products contemplated by the present invention may be prepared by proceeding in an analogous manner. The alkyl dihydroxy benzenes are then halogenated in any suitable manner, the chloride being formed, for example by treatment with sulfuryl chloride. The products may also be prepared by first halogenating a dihydroxy benzene and thereafter reacting the resulting product with an aliphatic acid chloride to form the ester which rearranges in the presence of various reagents such as zinc chloride to form the ketone. In case the corresponding alkyl composition is desired, the ketone is reduced to the alkyl composition by the Clemmensen method. The ethers are prepared by reacting the sodium salt of the dihydroxy halogenated phenol with the desired aliphatic alkylating agent, such as hexyl chloride or bromide. The hexyl derivative may be represented by the following formula:

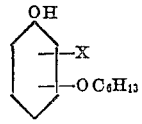

where X represents a halogen atom.

In general, these compositions may be employed in a manner analogous to that employed in connection with corresponding non-halogenated aliphatic derivatives of phenols in mouthwashes, toothpastes, fungus or mould preventive preparations as well as in general disinfectants for internal or external use. Various solvents, such as aqueous glycerol, glycol, ethyl alcohol, etc., may be employed either alone or in admixture with each other. Obviously, other ingredients may be added, depending upon the specific intended use to be made of the final product, including flavor, coloring matter, as well as other antiseptic compositions.

One example of the new class of disinfectants, namely, monochlor-hexyl resorcinol, which may be represented as:

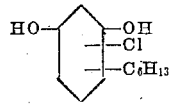

is prepared conveniently by the following method:

Resorcinol is dissolved in approximately four parts by weight of isopropyl ether, and the calculated amount of sulfuryl chloride necessary to form monochlor-resorcinol is added at 30°–35° C. while stirring the solution. The reaction is completed at approximately 60° C., after which the solvent is removed by distillation and the residual product distilled under reduced pressure. A weighed quantity of the monochlor-resorcinol thus prepared is melted and an approximately equimolecular portion of n-hexoyl chloride is added slowly while agitating the reaction mixture vigorously and maintaining the temperature at 100°–120° C. Anhydrous zinc chloride in amount equal to approximately 10% of the weight of the chlor-resorcinol employed is added, the temperature being maintained at 100°–120° C. for approximately three hours. The reaction mixture is washed with water and distilled in vacuum. The ketone, which may be represented as:

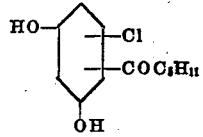

boils at 134° C. at approximately 5 mm. pressure. It is reduced to hexyl-chlor-resorcinol, if desired, by vigorously refluxing with dilute hydrochloric acid and amalgamated zinc for approximately 10 hours. The product is then washed with water and distilled, the boiling point being 153° C. at approximately 5 mm. pressure. The product melts at approximately 40° C.

If desired, the hexyl-monochlor-resorcinol may be prepared by chlorinating hexyl-resorcinol with sulfuryl chloride, distilling the product and subsequently crystallizing the same preferably from petroleum ether in the presence of water.

Another example of the new class of disinfectants, namely, the hexyl-monochlor-catechol, which may be represented as:

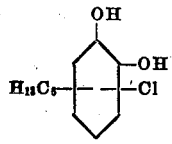

is prepared by chlorinating n-hexyl-catechol by any suitable method, as for example, by treatment with sulfuryl chloride or a solution of chlorine in carbon tetrachloride or acetic acid.

As a further example of the new disinfectants, a monochlor-octyl-resorcinol, which may be represented as:

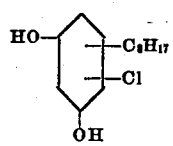

is prepared by condensing an octoic acid, such as that possessing the structure:

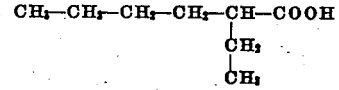

with resorcinol in the presence of zinc chloride, reducing the ketone thus formed by the Clemmensen method, and chlorinating the product by treatment with a suitable chlorinating agent, such as sulfuryl chloride.

A hydrated form having a melting point of 56° C. is obtained by crystallizing the product from petroleum ether containing a small amount of water. Its phenol coefficient is over thirteen hundred.

n-Heptyl-monochloro-catechol may be prepared by causing a solution of chlorine in acetic acid to react with an acetic acid solution of n-heptyl catechol. When the reaction mixture is poured into water, the product separates as an oil and may be purified by distilling in vacuum.

As an example of a brominated alkyl dihydroxy benzene, n-hexyl-monobrom-resorcinol may be prepared by adding bromine, diluted with acetic acid, to a solution of n-hexyl resorcinol in acetic acid. Upon dilution with water, the product separates as an oil.

By methods analogous to those described above, other derivatives may be prepared, such for examples, as n-hexoyl-chlor-resorcinol, n-octoyl-chlor-resorcinol, n-heptoyl-chlor-catechol, n-hexoyl-brom-resorcinol, alpha ethyl-hexoyl-brom-hydro-quinone, their corresponding alkyl derivatives, et al. Obviously, by substituting the appropriate alkyl bromide, or chloride, a corresponding ether is obtained from the alkali metal salt of the phenol.

These products possess high phenol coefficients and are suitable for the purposes herein set forth. It will be apparent from the foregoing description that the present invention affords a novel class of compositions which possess strong germicidal properties and which may be employed in very small amounts without defeating the purposes for which they are intended. While representative examples of the application of the principles of the invention have been set forth, these are illustrative only, since the invention is susceptible to many variations without departing from the scope thereof as defined in the appended claims.

Reference is made to my copending divisional application Serial Number 243,163, filed November 30, 1938, which claims subject matter disclosed herein, and my application Serial Number 660,524, filed March 13, 1933, which has issued as Patent No. 2,093,778, and which is a continuation-in-part of and which claims subject matter disclosed in the present application.

What I claim is:

1. A halogenated hydroxy benzene composition having inordinately high germicidal properties which may be represented by the formula

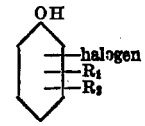

where $R_1$ is a hydroxy group and $R_2$ is a member of the group consisting of the alkyl and acyl groups, which groups have more than four and not more than twelve carbon atoms.

2. A halogenated dihydroxy benzene embodying an alkyl group having more than four carbon atoms.

3. A halogenated resorcinol embodying an alkyl side chain having more than four carbon atoms.

4. A halogenated dihydroxy benzene having an alkyl group joined to the benzene ring, said alkyl group containing at least six carbon atoms.

5. A halogenated resorcinol having an alkyl group joined to the benzene ring, said alkyl group containing at least six carbon atoms.

6. A nuclear halogenated dihydroxy benzene having an alkyl group, containing from six to twelve carbon atoms, directly joined to the benzene ring.

7. A nuclear halogenated dihydroxy benzene having an acyl group joined to the benzene ring, said acyl group containing at least six, and not more than 12, carbon atoms.

8. A halogenated dihydroxy benzene embodying an alkyl group joined to the benzene ring, said alkyl group having more than four and not more than twelve carbon atoms.

9. A halogenated resorcinol embodying an alkyl group joined to the benzene ring, said alkyl group having more than four and not more than twelve carbon atoms.

10. A chlorinated resorcinol embodying an alkyl group joined to the benzene ring, said alkyl group having more than four and not more than twelve carbon atoms.

11. A halogenated resorcinol having a hexyl group joined to the benzene ring.

12. A halogenated resorcinol having an octyl group joined to the benzene ring.

13. A bromo resorcinol having a hexyl group jointed to the benzene ring.

14. A bromo resorcinol having an octyl group joined to the benzene ring.

15. The product as defined in claim 1 and further characterized in that the halogen group is one of the following: bromine and chlorine.

16. The product as defined in claim 13 and further characterized in that the halogenated dihydroxy benzene is one of the following: a brominated dihydroxy benzene, a chlorinated dihydroxy benzene.

17. A halogenated resorcinol embodying a normal alkyl group joined to the benzene ring, said alkyl group having more than four and not more than twelve carbon atoms.

18. A halogenated dihydroxy benzene embodying a normal alkyl group joined to the benzene ring, said alkyl group having more than four and not more than twelve carbon atoms.

19. A halogenated dihydroxy benzene having an alkyl group joined to the benzene ring, said alkyl group containing six to nine carbon atoms.

20. Octyl chloro-resorcinol.

21. An octyl-resorcinol which is substituted in the benzene nucleus by one chlorine atom.

22. Normal octyl-resorcinol which is substituted in the benzene nucleus by one chlorine atom.

LUCAS P. KYRIDES.